US006922880B1

(12) United States Patent
Green

(10) Patent No.: US 6,922,880 B1
(45) Date of Patent: Aug. 2, 2005

(54) HINGE PIN-REMOVING TOOL

(76) Inventor: George Green, 950 Deerwood Dr., Dandridge, TN (US) 37725

( * ) Notice: Subject to any disclaimer, the term of this patent is extended or adjusted under 35 U.S.C. 154(b) by 139 days.

(21) Appl. No.: 10/645,247

(22) Filed: Aug. 22, 2003

(51) Int. Cl.$^{7}$ .................................. B23P 19/04
(52) U.S. Cl. .................................. 29/267
(58) Field of Search .................... 29/267, 268, 249, 29/275, 254, 255, 276, 278, 280, 283, 257

(56) References Cited

U.S. PATENT DOCUMENTS

| | | | | |
|---|---|---|---|---|
| 3,314,320 A | * | 4/1967 | Early | 81/419 |
| 3,602,969 A | | 9/1971 | Provost | |
| 4,531,716 A | | 7/1985 | Rish | |
| 4,776,568 A | | 10/1988 | Perel | |
| D300,800 S | | 4/1989 | Sutphen, Jr. | |
| 5,010,710 A | * | 4/1991 | Gray et al. | 52/741.14 |
| 5,365,649 A | * | 11/1994 | Carl et al. | 29/267 |
| 5,438,743 A | | 8/1995 | Simington et al. | |
| 5,875,535 A | | 3/1999 | Canoy | |
| 6,308,390 B1 | | 10/2001 | Sullivan | |
| 6,684,471 B2 | * | 2/2004 | Jones | 29/244 |

* cited by examiner

*Primary Examiner*—Robert C. Watson
(74) *Attorney, Agent, or Firm*—Donald R. Schoonover

(57) ABSTRACT

A hand tool is adapted to remove a hinge pin from a hinge on a door or the like. The hinge pin is pushed out of the hinge by application of force to one end of the hinge pin in a direction that is aligned with the longitudinal axis of the hinge pin. The hand tool includes a main body that is removably attached to the hinge and a hinge pin-engaging unit on the main body. The hinge pin-engaging unit includes a drive pin slidably attached to the main body and a lever arm that is attached to the drive pin at a distal end of the lever arm and is also pivotally attached to the main body by a fulcrum that is attached to the lever arm between the distal end of the lever arm and a proximal end of the lever arm to form a first class lever. A handle is threadably attached to the lever arm adjacent to the proximal end of the lever arm.

2 Claims, 1 Drawing Sheet

HINGE PIN-REMOVING TOOL

BACKGROUND OF THE INVENTION

1. Field of the Invention

The present invention relates to the general art of hand tools, and to the particular field of a specialty hand tool that is used to remove a hinge pin from a hinge unit.

2. Discussion of Related Information

As is well known, doors of all kinds are generally mounted using hinges. These hinges have wings that are attached to the door and to the frame on which the door is mounted. A hinge pin, or pintle, connects the two wings in a manner which permits the wings to move with respect to each other. This permits the door to open or close.

Often, a door must be removed from the frame. This may be the case during repair of the door or of the building or to move a large object through the door. A door is removed by first removing the hinge pin from the hinge, and then moving the door away from the frame. However, most hinge pins are held securely in place so they do not inadvertently come out during operation of the door. This is desirable from the standpoint of reliability and operation of the door. However, it may create a problem if the door is to be removed because it may make deliberate removal of the hinge pin difficult.

Heretofore, many workers use screwdrivers or the like to move a hinge pin into a position in which it can be grasped by pliers or the like. Then, the pin is grasped and removed. This is effective, but may endanger the finish of the hinge or the door or the door frame. It also may be cumbersome if the hinge is in a difficult-to-reach location. This may also be a time-consuming operation if the hinge pin is stuck in the hinge.

Therefore, there is a need for a hand tool that can remove a hinge pin from a hinge without endangering the finish of the hinge or of a door associated with the hinge.

Therefore, there is also a need for a hand tool that can quickly and easily remove a hinge pin from a hinge, even in a difficult-to-reach location.

While the hand tool art has several examples of hinge pin removers, none of these known devices is as reliable and as easy to operate as possible. Many of these devices require an element to be forced between the hinge pin and the hinge, which raises the possibility of marring or scratching the finish of the hinge or the door or the door frame. Still others require some sort of hammering to remove the hinge pin. As with the just-discussed devices, hammering may create a hinge or structure-marring possibility. Many of the known hinge pin-removing devices contact structures or elements in addition to the hinge pin. This reduces the force applied to the hinge pin itself and thus reduces the efficiency of the tool.

PRINCIPAL OBJECTS OF THE INVENTION

It is a main object of the present invention to provide a hand tool that can remove a hinge pin from a hinge without endangering the finish of the hinge or of a door associated with the hinge.

It is another object of the present invention to provide a hand tool that can quickly and easily remove a hinge pin from a hinge.

It is another object of the present invention to provide a hand tool that can quickly and easily remove a hinge pin from a hinge in an efficient and effective manner.

SUMMARY OF THE INVENTION

These, and other, objects are achieved by a hand tool adapted to remove hinge pins which comprises a main body unit; a hinge-engaging hook unit on the main body unit; and a hinge pin-engaging unit on the main body unit, the hinge pin-engaging unit includes a sleeve fixed on the main body unit and having a bore defined therethrough, a drive pin slidably received in the bore defined through the sleeve, the drive pin being slidable between a retracted position and a hinge pin-engaging position, the drive pin being adapted to engage one end of a hinge pin which has a longitudinal axis and apply hinge pin-removing force to the hinge pin in a direction which is aligned with the longitudinal axis of the hinge pin and which is applied in a manner that pushes the hinge pin, and a lever unit attached to the main body unit and to the drive pin, the lever unit including a lever arm having a distal end and a proximal end, with the distal end pivotally fixed to the drive pin, a fulcrum pivotally attaching the lever arm to the main body unit, the fulcrum being located between the distal end of the lever arm and the proximal end of the lever arm, and a handle attached to the proximal end of the lever arm.

Using the device of the present invention, a hinge pin or pintle can be removed from a hinge without marring the finish of the door or the hinge. The hinge pin is easily and quickly removed. The hinge pin is removed by pushing directly on the hinge pin in a direction that pushes the hinge pin so force is applied to the exact element being removed. This not only increases the efficiency of the removing device, it reduces the possibility of marring or damaging any other element or structure adjacent to the hinge pin.

BRIEF DESCRIPTION OF THE DRAWING FIGURES

DETAILED DESCRIPTION OF THE PREFERRED EMBODIMENT

Figure 2:
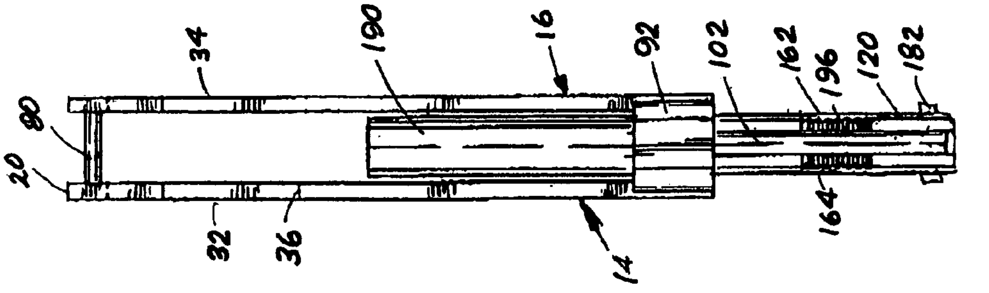
FIG. 2 is a front elevational view of the hinge pin-removing hand tool shown in FIG. 1.

Other objects, features and advantages of the invention will become apparent from a consideration of the following detailed description and the accompanying drawings.

Referring to the Figures, it can be understood that the present invention is embodied in a hand tool 10 for removing hinge pins or pintles from hinge mechanisms such as are found on doors, or the like. Tool 10 comprises a body unit 12 which has first and second identical J-shaped body sections 14 and 16. Each J-shaped body section 14, 16 includes a main body element 18 which has a first end 20, a second end 22, and a longitudinal axis 24 which extends between the first end 20 and the second end 22. Each main body section 18 further includes a first side edge 26, a second side edge 28, and a transverse axis 30 which extends between the first side edge 26 and the second side edge 28. Each main body section further includes a first face 32, a second face 34, and a thickness 36 which extends between the first face 32 and the second face 34.

A hook element 40 is located on the first side edge 26 at the first end 20 of each main body unit 18 and has a trunk section 42 which includes a proximal end 44 unitary with the first side edge 26 of the main body 18 with which the hook element 40 is associated, a distal end 46 which is spaced apart from the proximal end 44, and a longitudinal axis 48 which extends between the proximal end 44 and the distal end 46 and which extends in the direction of the transverse axis 30 of the main body 18 associated with the hook element 40. The trunk section 42 of each hook element 40 further includes a first side edge 50 that is co-planar with the first end 20 of the main body 18 associated with the hook element 40, and a second side edge 52 that is spaced apart from the first side edge 50 of the hook element 40 in the direction of the longitudinal axis 30 of the main body 18 associated with the hook element 40. The trunk section 42 of each hook element 40 further includes a first surface 56 that is co-planar with the first surface of the main body 18 associated with the hook element 40 and a second surface 58 that is co-planar with the second surface of the main body 18 associated with the hook element 40.

Each of the hook elements 40 further includes a head section 60 that is unitary with the trunk section 42. Each head section 60 includes a proximal end 62 attached to the distal end 46 of the trunk section 42 on the second side edge 52 of the trunk section 42 and a distal end 64 spaced apart from the proximal end 62 of the head section 60 in the direction of the longitudinal axis 24 of the main body 18 associated with the hook element 40.

Each head section 60 further includes a first side edge 70 and a second side edge 72 which is spaced apart from the first side edge 70 of the head section 60 in the direction of the transverse axis 30 of the main body 18 associated with the hook element 40 and toward the first side edge 26 of the main body 18 associated with the hook element 40. The second side edge 52 of the hook element 40 is spaced apart from the first side edge 26 of the main body 18 associated with the hook element 40. A gap 74 is defined between the first side edge 26 of the main body 18 and the second side edge 72 of the head section 60 of the hook element 40 associated with the hook element 40. Gap 74 extends in the direction of the longitudinal axis 24 of the main body 18 associated with the hook element 40 and extends from the second side edge 52 of the trunk section 42 of the hook element 40 toward the second end 22 of the main body 18 associated with the hook element 40. The gap 74 is sized and adapted to accommodate a body B of a hinge element H adjacent to one end edge of the hinge element.

A first cross brace element 80 fixes the main body 18 of the first J-shaped body section 14 to the main body 18 of the second J-shaped body section 16 near the second end 22 of each main body 18 and near the second end edge of each main body 18. A second cross brace element 82 fixes the main body 18 of the first J-shaped body section 14 to the main body 18 of the second J-shaped body section 16 near the first end 20 of each main body 18 and near the second end edge of each main body 18.

A hinge pin-engaging unit 90 includes a sleeve 92 fixed to the first side edge 26 of the main body 18 of both the first and second J-shaped body sections 14, 16 near the second end 22 of the main body 18 of each J-shaped body section 14, 16. The sleeve 92 includes a cylindrical body 94 which has a first end 96, a second end 98 which is co-planar with the second end 22 of the main body 18 of each of the J-shaped body sections 14, 16, and a bore 100 which extends from the first end 96 of the cylindrical body 94 to the second end 98 of the cylindrical body 94.

Figure 1:
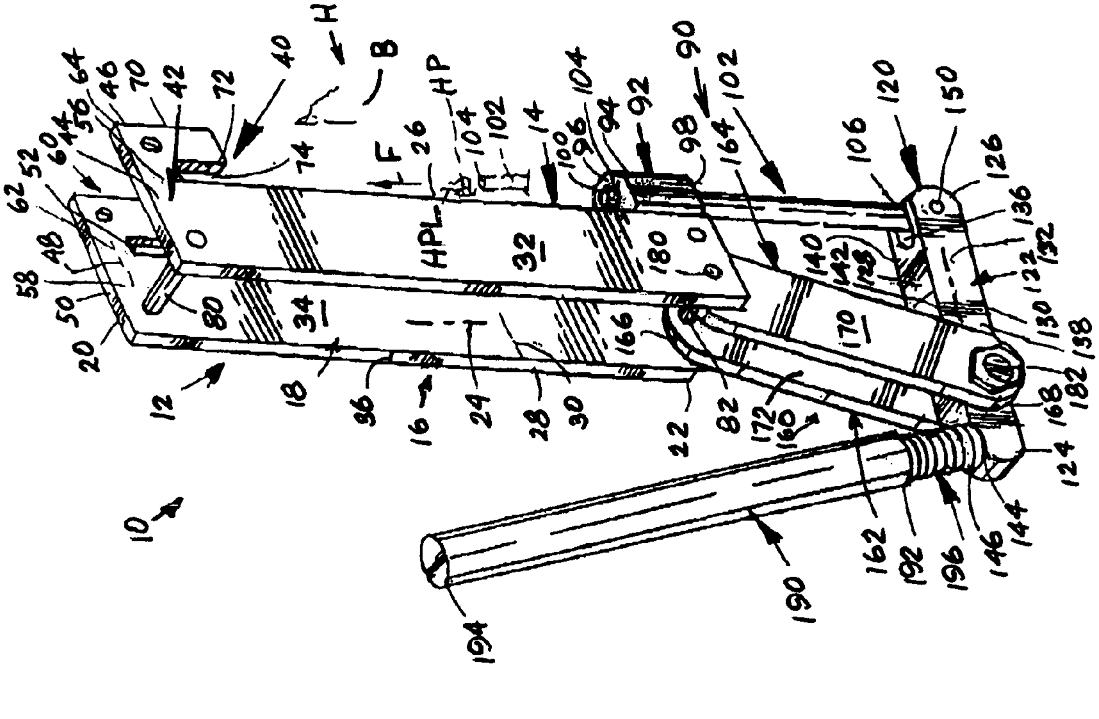
FIG. 1 is a perspective view of a hinge pin-removing hand tool embodying the present invention.

A drive pin 102 is slidably accommodated in the bore 100 of the sleeve 92. The drive pin 102 includes a distal end 104 located adjacent to the sleeve 92 and a proximal end 106 spaced apart from the sleeve 92. The drive pin 102 is slidable between a hinge-abutting position indicated in FIG. 1 by dotted lines in which the drive pin 102 directly contacts the end of a hinge pin HP and thus applies hinge pin-removing force directly to the end of the hinge pin in a direction that will remove the hinge pin, and a retracted position indicated in FIG. 1 in solid lines. The hinge pin has a longitudinal axis HPL which extends in the direction of longitudinal axis 24 of the main bodies 18. Movement of the drive pin is linear and is aligned with the hinge pin longitudinal axis HPL. This makes force applied to the hinge pin efficiently directed in the hinge pin removal direction. This makes the tool very efficient and effective. The proximal end 106 of the drive pin 102 is closer to the sleeve 92 in the hinge pin-abutting position than in the retracted position. The direct application of hinge pin-removing force to the hinge pin in direction F which is in alignment with the hinge pin longitudinal axis applies such hinge pin-removing force to the hinge pin in a manner that is most efficient and effective since the hinge pin-removing force is directed solely and directly to the hinge pin and is solely directed in the direction of hinge pin removal. No other leveraging, or movement is needed, all of the force is in hinge pin-removing direction F which is longitudinally directed along the hinge pin.

A hinge pin drive lever unit 120 includes a lever arm 122 which has a proximal end 124, a distal end 126, a first side edge 128, a second side edge 130, and a longitudinal axis 132 which extends between the distal end 126 of the lever arm 122 and the proximal end 124 of the lever arm 122 and in the direction of the transverse axis 30 of each of the main bodies 18. The lever arm 122 further includes a groove 136 defined therein near the distal end 126 of the lever arm 122. The groove 136 extends from the first side edge 128 of the lever arm 122 to the second side edge 130 of the lever arm 122. The lever arm 122 further includes a first side surface 138 and a second side surface 140, and a thickness 142 extending between the first side surface 138 of the lever arm 122 and the second side surface 140 of the lever arm 122. The lever arm 122 further includes a blind-ended bore 144 defined therein adjacent to the proximal end 124 of the lever arm 122. The lever arm 122 further includes a screw thread 146 defined thereon adjacent to the blind-ended bore 144.

A pivot pin 150 pivotally attaches the proximal end 106 of the drive pin 102 to the lever arm 122. The pivot pin 150 extends across the groove 136 defined in the lever arm 122 and the drive pin 102 is accommodated in the groove 136 defined in the lever arm 122.

A fulcrum unit 160 includes first and second arm elements 162 and 164. The arm elements 162, 164 are identical to each other. Each arm element 162, 164 includes a first end 166, a second end 168, a first surface 170, and a second surface 172. The first surface 170 of each arm element 162, 164 slidably abuts the second surface of a main body associated therewith.

A first pivot pin 180 pivotally attaches each arm element 162, 164 to a main body 18 associated therewith. The first pivot pin 180 attaching each arm element 162, 164 to the associated main body 18 is located adjacent to the first end 166 of each arm element 162, 164.

A second pivot pin 182 extends through the lever arm 122 in the direction of the thickness 142 of the lever arm 122.

The second end 168 of each arm element 162, 164 is pivotally attached to the second pivot pin 182.

A handle 190 has a proximal end 192, a distal end 194, and a screw thread 196 is defined on the handle 190 adjacent to the proximal end 192. Screw thread 196 on the handle 190 threadably engages the screw thread 146 on the lever arm 122 to attach the handle 190 to the lever arm 122.

The fulcrum unit 160 is located between the distal end 126 and the proximal end 124 of the lever arm 122 so that the lever unit 120 is a first class lever.

Operation of the device 10 is evident from the above teaching. With the door about half way open, the device is hung over the top of each side of the hinge. The hinge pin driver is aligned with the pintle or hinge pin and the handle 190 is operated to pivot the lever arm 122 so the distal end 126 of the lever arm 122 moves upwardly. The hinge pin itself is directly contacted by the driver and this drives the hinge pin out of the hinge without the use of a hammer or a screw driver which may mar the finish of the door or the hinge. This also concentrates all of the removing force directly onto the hinge pin and thus makes the tool very efficient.

It is understood that while certain forms of the present invention have been illustrated and described herein, it is not to be limited to the specific forms or arrangements of parts described and shown.

What is claimed and desired to be covered by Letters Patent is:

1. A hand tool for removing hinge pins comprising:

a) a body unit having first and second identical J-shaped body sections, each J-shaped body section including (1) a main body element having a first end, a second end, a longitudinal axis extending between the first end and the second end, a first side edge, a second side edge, a transverse axis extending between the first side edge and the second side edge, a first face, a second face, and a thickness extending between the first face and the second face, (2) a hook element located on the first side edge at the first end of each main body unit and having a trunk section which includes (A) a proximal end unitary with the first side edge of the main body with which the hook element is associated, (B) a distal end spaced apart from the proximal end, (C) a longitudinal axis extending between the proximal end and the distal end and extending in the direction of the transverse axis of the main body associated with the hook element, (D) a first side edge that is co-planar with the first end of the main body associated with the hook element, (E) a second side edge spaced apart from the first side edge of the hook element in the direction of the longitudinal axis of the main body associated with the hook element, (F) a first surface that is co-planar with the first surface of the main body associated with the hook element, and (G) a second surface that is co-planar with the second surface of the main body associated with the hook element, (3) the hook element further including a head section that is unitary with the trunk section, the head section including (A) a proximal end attached to the distal end of the trunk section on the second side edge of the trunk section, (B) a distal end spaced apart from the proximal end of the head section in the direction of the longitudinal axis of the main body associated with the hook element, (C) a first side edge, and (D) a second side edge which is spaced apart from the first side edge of the head section in the direction of the transverse axis of the main body associated with the hook element and toward the first side edge of the main body associated with the hook element, the second side edge of the hook element being spaced apart from the first side edge of the main body associated with the hook element, (4) a gap defined between the first side edge of the main body and the second side edge of the head section of the hook element associated with the hook element, the gap extending in the direction of the longitudinal axis of the main body associated with the hook element and extending from the second side edge of the trunk section of the hook element toward the second end of the main body associated with the hook element, (5) the gap being sized and adapted to accommodate a body of a hinge element adjacent to one end edge of the hinge element, (6) a first cross brace element fixing the main body of the first J-shaped body section to the main body of the second J-shaped body section near the second end of each main body and near the second end edge of each main body, and (7) a second cross brace element fixing the main body of the first J-shaped body section to the main body of the second J-shaped body section near the first end of each main body and near the second end edge of each main body;

b) a hinge pin-engaging unit which includes (1) a sleeve fixed to the first side edge of the main body of both the first and second J-shaped body sections near the second end of the main body of each J-shaped body section, the sleeve including a cylindrical body, the cylindrical body having a first end, a second end which is co-planar with the second end of the main body of each of the J-shaped body sections, and a bore extending from the first end of the cylindrical body to the second end of the cylindrical body, and (2) a drive pin slidably accommodated in the bore of the sleeve, the drive pin including a distal end located adjacent to the sleeve, a proximal end located spaced apart from the sleeve, the drive pin being slidable between a hinge-abutting position and a retracted position, with the proximal end of the drive pin being closer to the sleeve in the hinge pin-abutting position than in the retracted position, the drive pin being located and adapted to directly contact one end of a hinge pin when in the hinge pin-abutting position, the hinge pin having a longitudinal axis and movement of the drive pin from the retracted position to the hinge pin-abutting position being linear and in alignment with the longitudinal axis of the hinge pin and in a direction which is applied in a manner that pushes the hinge pin; and c) a hinge pin drive lever unit which includes (1) a lever arm having a proximal end, a distal end, a first side edge, a second side edge, a longitudinal axis extending between the distal end of the lever arm and the proximal end of the lever arm and in the direction of the transverse axis of each of the main bodies, the lever arm further including a groove defined therein near the distal end of the lever arm, the groove extending from the first side edge of the lever arm to the second side edge of the lever arm, the lever arm further including a first side surface and a second side surface and a thickness extending between the first side surface of the lever arm and the second side surface of the lever arm, the lever arm further including a blind-ended bore defined therein adjacent to the proximal end of the lever arm, the lever arm further including a screw thread defined thereon adjacent to the blind-ended bore, (2) a pivot pin pivotally attaching the proximal end of the drive pin to the lever arm, the pivot pin extending across the groove defined in the lever arm and the drive pin being accommodated in the groove defined in the lever arm, (3) a fulcrum unit which includes (A) first and second arm elements, the arm elements being identical to each other, each arm element including a first end, a second end, a first surface, and a second surface, the first surface of each arm element slidably abutting the second surface of a main body associated therewith, (B) a first pivot pin pivotally attaching each arm element to a main body associated therewith, the first pivot pin attaching each arm element to the associated main body being located adjacent to the first end of each arm element, (C) a second pivot pin which extends through the lever arm in the direction of the thickness of the lever arm, (D) the second end of each arm element being pivotally attached to the second pivot pin, (4) a handle having a proximal end, a distal end, a screw thread defined on the handle adjacent to the proximal end, the screw thread on the handle threadably engaging the screw thread on the lever arm to attach the handle to the lever arm, and (5) the fulcrum unit being located between the distal end and the proximal end of the lever arm and the lever unit being a first class lever.

2. A hand tool adapted to remove hinge pins comprising:

a) a main body unit;

b) a hinge-engaging hook unit on said main body unit; and c) a hinge pin-engaging unit on said main body unit, said hinge pin-engaging unit including (1) a sleeve fixed on said main body unit and having a bore defined therethrough, (2) a drive pin slidably received in the bore defined through the sleeve, the drive pin being slidable between a retracted position and a hinge pin-engaging position, the drive pin being adapted to engage one end of a hinge pin which has a longitudinal axis and apply hinge pin-removing force to the hinge pin in a direction which is aligned with the longitudinal axis of the hinge pin and which is applied in a manner that pushes the hinge pin, and (3) a lever unit attached to said main body unit and to the drive pin, the lever unit including (A) a lever arm having a distal end and a proximal end, with the distal end pivotally fixed to the drive pin, (B) a fulcrum pivotally attaching the lever arm to said main body unit, the fulcrum being located between the distal end of the lever arm and the proximal end of the lever arm, and (C) a handle attached to the proximal end of the lever arm.

* * * * *